US008508691B2

(12) United States Patent
Miyamoto et al.

(10) Patent No.: US 8,508,691 B2
(45) Date of Patent: Aug. 13, 2013

(54) OPTICAL PATH UNIT AND LIQUID CRYSTAL DISPLAY DEVICE

(75) Inventors: Tomonori Miyamoto, Ibaraki (JP); Motohiro Yamahara, Nara (JP); Hiroyuki Kumasawa, Niihama (JP); Akiyoshi Kanemitsu, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 158 days.

(21) Appl. No.: 13/058,211

(22) PCT Filed: Aug. 10, 2009

(86) PCT No.: PCT/JP2009/064133
§ 371 (c)(1),
(2), (4) Date: Mar. 22, 2011

(87) PCT Pub. No.: WO2010/018812
PCT Pub. Date: Feb. 18, 2010

(65) Prior Publication Data
US 2011/0181810 A1 Jul. 28, 2011

(30) Foreign Application Priority Data

Aug. 12, 2008 (JP) .................................. 2008-207553
Nov. 13, 2008 (JP) .................................. 2008-290489

(51) Int. Cl.
*G02F 1/1335* (2006.01)
(52) U.S. Cl.
USPC .............................................. 349/64; 349/62
(58) Field of Classification Search
USPC ...................................................... 349/61–67
See application file for complete search history.

(56) References Cited

U.S. PATENT DOCUMENTS

| 5,914,759 | A | * | 6/1999 | Higuchi et al. ................. 349/57 |
| 7,478,913 | B2 | * | 1/2009 | Epstein et al. .................. 349/62 |
| 7,789,538 | B2 | * | 9/2010 | Epstein et al. ................. 362/330 |
| 2008/0303975 | A1 | * | 12/2008 | Mizuno et al. ................. 349/62 |

FOREIGN PATENT DOCUMENTS

| JP | 07-141908 A | 6/1995 |
| JP | 07-152031 A | 6/1995 |
| JP | 08-022000 A | 1/1996 |
| JP | 2003-140126 A | 5/2003 |
| JP | 2005-128363 A | 5/2005 |
| JP | 2008-130533 A | 6/2008 |
| JP | 2008-145468 A | 6/2008 |

OTHER PUBLICATIONS

Second Office Action issued Nov. 14, 2012 in Chinese Patent Application No. 200980131238.5 to Sumitomo Chemical Co., Ltd., with English translation.
Decision on Rejection issued May 30, 2013 in Chinese Patent Application No. 200980131238.5 to Sumitomo Chemical Co., Ltd., with English translation.

* cited by examiner

*Primary Examiner* — Dung Nguyen
(74) *Attorney, Agent, or Firm* — Sughrue Mion, PLLC

(57) ABSTRACT

An optical path unit and a liquid crystal display device excellent in luminance in the front direction are provided. A backlight unit 2, two prism films 4a and 4b, a first polarizing plate 5, a liquid crystal cell 1 having a liquid crystal layer between a pair of substrates, and a second polarizing plate 6 are disposed in the sequence. The prism films 4a and 4b are provided with a plurality of linear prisms in parallel on a light incident surface, the linear prisms having a polygonal and tapered cross section and an endmost vertex angle of 90° to 110°. The first polarizing plate 5 and the second polarizing plate 6 are disposed such that transmission axes thereof have a crossed Nicols relationship. The prism film 4a is disposed such that the ridge lines of the linear prisms are substantially in parallel with the transmission axis of the first polarizing plate 5, and the prism film 4b is disposed such that the ridge lines of the linear prisms are substantially in parallel with the transmission axis of the second polarizing plate 6.

10 Claims, 15 Drawing Sheets

(a)

(b)

(a)

(b)

(a) VERTEX ANGLE 90°

(b) VERTEX ANGLE 95°

(c) VERTEX ANGLE 110°

OPTICAL PATH UNIT AND LIQUID CRYSTAL DISPLAY DEVICE

CROSS REFERENCE TO RELATED APPLICATIONS

This Application is a National Stage of International Application No. PCT/JP2009/064133 filed Aug. 10, 2009, claiming priority based on Japanese Patent Application No. 2008-207553 filed Aug. 12, 2008 and Japanese Patent Application No. 2008-290489 filed Nov. 13, 2008, the contents of all of which are incorporated herein by reference in their entirety.

TECHNICAL FIELD

The present invention relates to an optical path unit and a liquid crystal display device.

BACKGROUND ART

A liquid crystal display device has at least a backlight unit having a light source, a liquid crystal cell having a liquid crystal display element, and two polarizing plates disposed at anteroposterior positions in the direction of transmission of the light emerging from the liquid crystal cell. Normally, the liquid crystal display element controls the amount of light to be transmitted among the light emitted from the backlight unit for every pixel thereby displaying an image.

Such a conventional liquid crystal display device includes a backlight unit which is provided with a case 21 having a surface opening and having an internal peripheral surface that exhibits a light reflection effect and a plurality of cold cathode fluorescent lamps (CCFLs) 22 disposed in parallel in the case 21, as shown in FIG. 12, for example. A light diffusion plate 3 is mounted so as to close the opening of the case 21. A prism film 40 is disposed so as to overlap the light-exiting surface of the light diffusion plate 3 (refer to Patent Literature 1, for example).

CITATION LIST

Patent Literature

[Patent Literature 1] Japanese Unexamined Patent Application

SUMMARY OF INVENTION

Technical Problem

In the conventional liquid crystal display device, however, light is diffused toward a wide range of direction from the backlight and the light diffusion means (light diffusion plate and light guide plate). The luminance is then insufficient in the perpendicular direction of the light-exiting surface of the backlight or the light diffusion means (hereinafter may be referred to as front direction). Thus, a liquid crystal display device having improved luminance in the front direction is demanded.

In view of such a technical background, the present invention is intended to provide an optical path unit and a liquid crystal display device excellent in luminance in the front direction.

Solution to Problem

An optical path unit according to the present invention includes, in sequence from a light incident direction, a light deflecting means, a first polarizing plate, a liquid crystal cell having a liquid crystal layer provided between a pair of substrates, and a second polarizing plate. The first polarizing plate and the second polarizing plate are disposed such that transmission axes thereof have a crossed Nicols relationship. The light deflecting means has two prism films provided on a light incident surface with a plurality of linear prisms having a polygonal and tapered cross section and an endmost vertex angle of 90° to 110° at predetermined intervals. One of the prism films is disposed such that a ridge line direction of the linear prisms is substantially in parallel with the transmission axis of the first polarizing plate; and the other prism film is disposed such that a ridge line direction of the linear prisms is substantially in parallel with the transmission axis of the second polarizing plate. The endmost apex portions of the linear prisms of the present invention may be entirely or partially round within the scope not unfavorable to the effects of the present invention.

It is preferred that the ridge lines of the linear prisms have a linear shape or a wavy shape viewed from the light incident surface. In the present specification, the direction of the ridge lines in case where it is a wavy shape viewed from the light incident surface refers to the direction of a regression line obtained by a least-square method.

Either or both of the two prism films may be provided with at least two linear prisms having different heights.

Furthermore, at least one of the linear prisms may have ridge lines uneven in a height direction.

A liquid crystal display device according to the present invention includes, in sequence, a backlight unit, a light deflecting means, a first polarizing plate, a liquid crystal cell having a liquid crystal layer provided between a pair of substrates, and a second polarizing plate. The first polarizing plate and the second polarizing plate are disposed such that transmission axes thereof have a crossed Nicols relationship. The light deflecting means has two prism films provided on a light incident surface with a plurality of linear prisms having a polygonal and tapered cross section and an endmost vertex angle of 90° to 110° at predetermined intervals. One of the prism films is disposed such that a ridge line direction of the linear prisms is substantially in parallel with the transmission axis of the first polarizing plate; and the other prism film is disposed such that a ridge line direction of the linear prisms is substantially in parallel with the transmission axis of the second polarizing plate.

It is preferred that a light diffusion means be further disposed between the backlight unit and the light deflecting means. Furthermore, an anti-glare layer may be provided on the light incident surface of the second polarizing plate.

In the above optical path unit and the liquid crystal display device, it is preferred that the light incident surfaces of the two prism films have a mean center-line roughness Ra of 0.3 µm or less and a ten-point mean roughness Rz of 1 µm or less.

Advantageous Effects of Invention

In the optical path unit and the liquid crystal display device according to the present invention, the two prism films are used as the light deflecting means, the prism films being provided on the light incident surface with the plurality of linear prisms having a polygonal and tapered cross section and an endmost vertex angle of 90° to 110° at predetermined intervals. One of the prism films is disposed such that the ridge line direction of the linear prisms is substantially in parallel with the transmission axis of the first polarizing plate; and the other prism film is disposed such that the ridge line direction of the linear prisms is substantially in parallel with the transmission axis of the second polarizing plate. Thus, the light emerging from the light deflecting means is collected in the front direction, and the luminance in the front direction is enhanced.

BRIEF DESCRIPTION OF DRAWINGS

FIG. 13($b$) is a view of a planar surface $4b$ in FIG. 13($a$) viewed from a perpendicular direction thereof;

DESCRIPTION OF EMBODIMENTS

A liquid crystal display device according to the present invention is explained below with reference to the drawings. The present invention, however, is by no means limited to the embodiments below.

Figure 1:
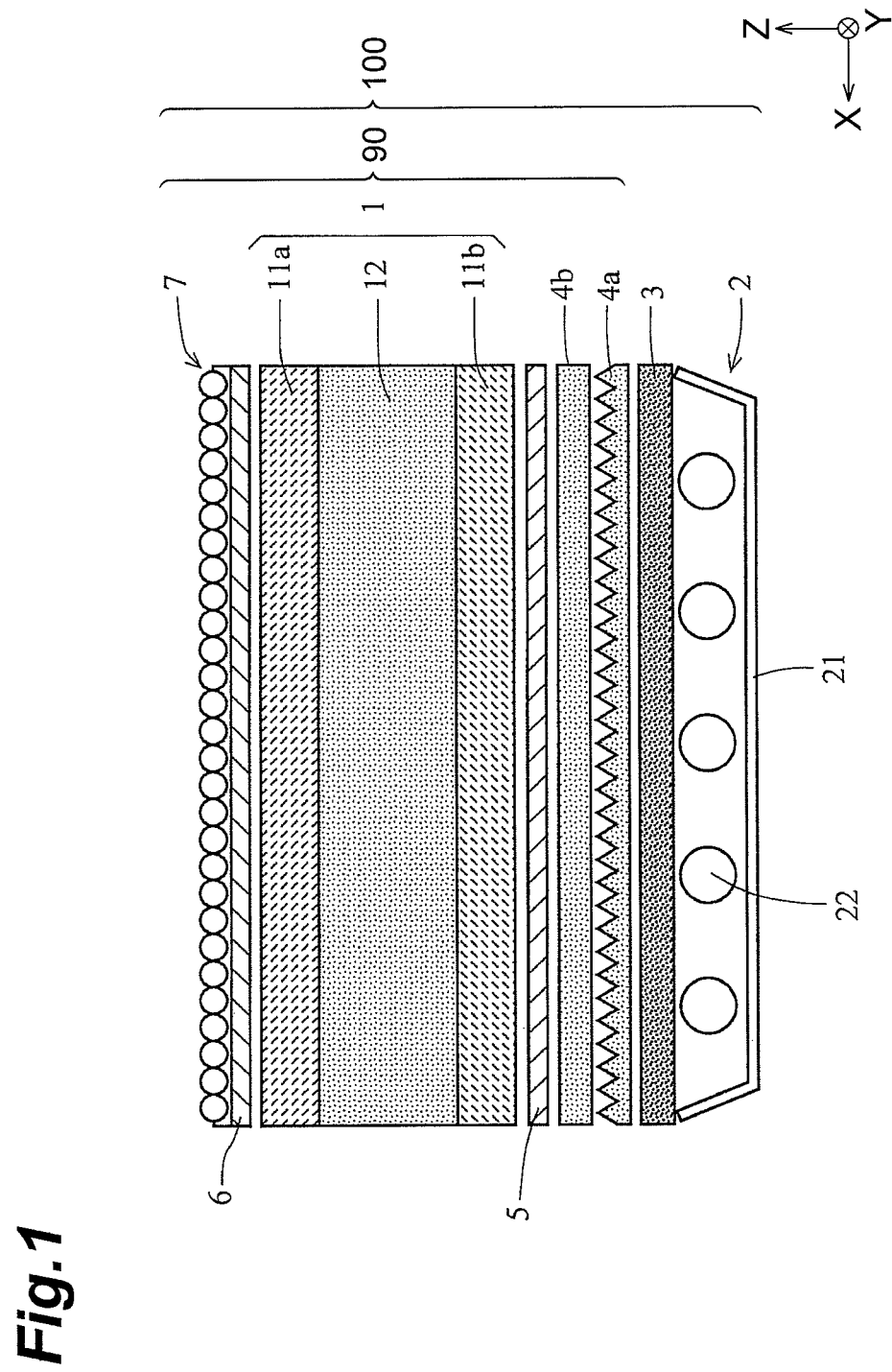
FIG. 1 is a schematic view illustrating an example of a liquid crystal display device according to the present invention.

FIG. 1 is a schematic view illustrating an embodiment of an optical path unit 90 and a liquid crystal display device 100 according to the present invention. The liquid crystal display device 100 in FIG. 1 is a normally white mode TN liquid crystal display device. The liquid crystal display device 100 is provided in sequence with a backlight unit 2, a light diffusion plate 3, two prism films $4a$ and $4b$ as light deflecting means, a first polarizing plate 5, a liquid crystal cell 1 having a liquid crystal layer 12 provided between a pair of transparent substrates $11a$ and $11b$, a second polarizing plate 6, and an anti-glare layer 7. The optical path unit 90 is provided in sequence with the two prism films $4a$ and $4b$ as light deflecting means, the first polarizing plate 5, the liquid crystal cell 1 having the liquid crystal layer 12 provided between the pair of transparent substrates $11a$ and $11b$, the second polarizing plate 6, and the anti-glare layer 7. The perpendicular line of the light-exiting surface of the light diffusion plate 3 is provided substantially in parallel with the Z axis. In the case where the light diffusion plate 3 is not provided, the perpendicular line of the light-exiting surface (opening portion) of the backlight 2 is provided substantially in parallel with the Z axis. Furthermore, the perpendicular line of the light incident surface of the prism films $4a$ and $4b$ is provided substantially in parallel with the Z axis. The term "substantially parallel" throughout the specification refers to cases including completely parallel and inclining from the parallel within an angle range of approximately ±5°.

Figure 2:
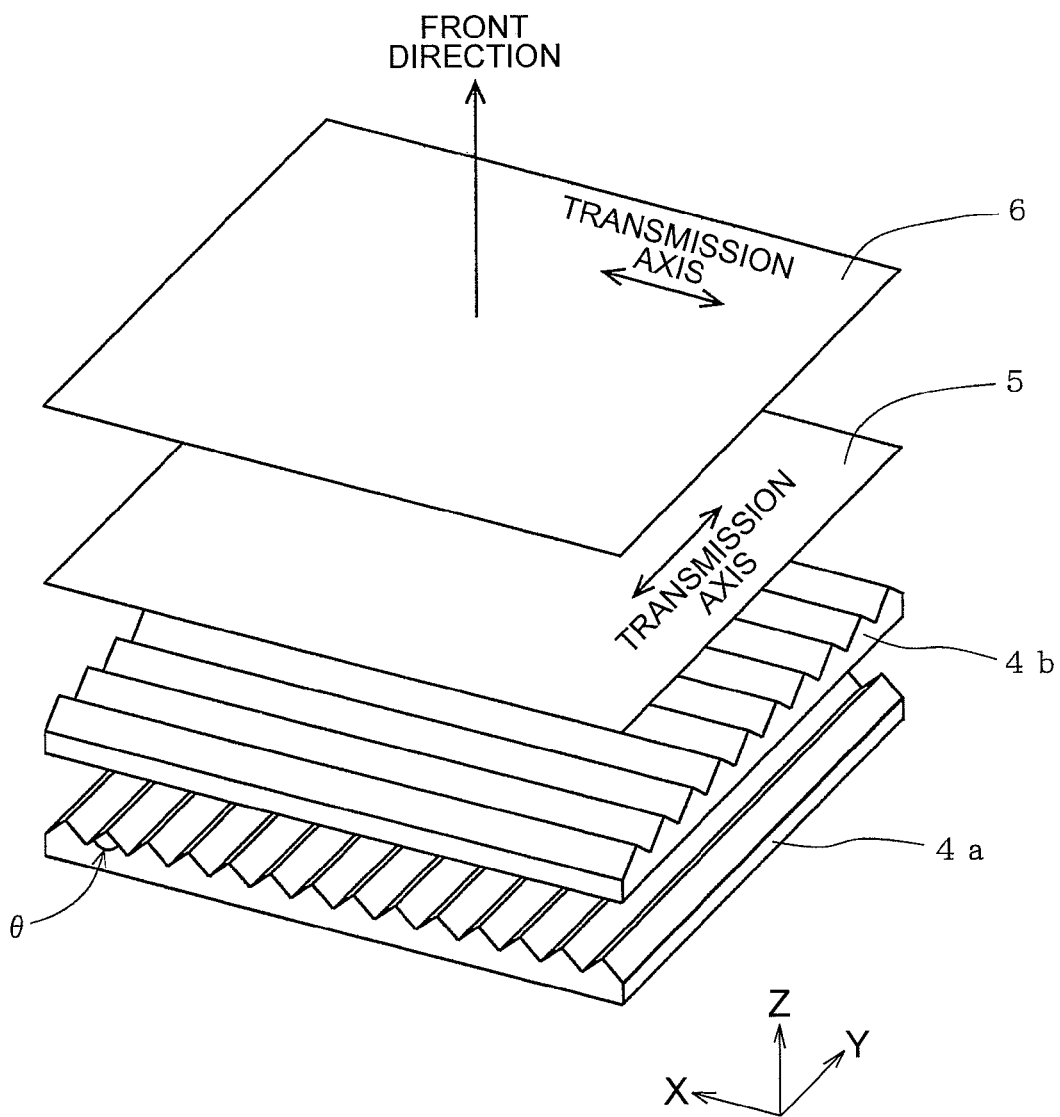
FIG. 2 is a schematic view illustrating an example of placement of prism films and polarizing plates.

As shown in FIG. 2, the first polarizing plate 5 and the second polarizing plate 6 are disposed such that transmission axes thereof (Y direction and X direction) have a crossed Nicols relationship. Each of the two prism films $4a$ and $4b$ has a flat light incident surface and a plurality of linear prisms having a triangle cross-sectional shape formed in parallel on the light-exiting surface. The prism film $4a$ is disposed such that the linear ridge lines of the linear prisms are provided substantially in parallel with the transmission axis of the first polarizing plate 5. The prism film $4b$ is disposed such that the linear ridge lines of the linear prisms are provided substantially in parallel with the transmission axis of the second polarizing plate 6. The vertex angle $\theta$ of the linear prism having a triangle cross-sectional shape is within a range of 90° to 110°. The triangle cross-sectional shape may be equilateral or inequilateral. In order to collect light in the front direction, however, an isosceles triangle is preferable. A configuration is preferred in which an adjacent isosceles triangle is sequentially arrayed adjacent to a base facing to a vertex angle, and ridge lines, which are rows of vertex angles, form long axes so as to be provided substantially in parallel with each other. In this case, the vertex angle and the base angle may have curvature unless the light gathering capacity is significantly reduced. The distance between the ridge lines is normally within a range of 10 μm and 500 μm, preferably within a range of 30 μm and 300 μm.

Figure 13:
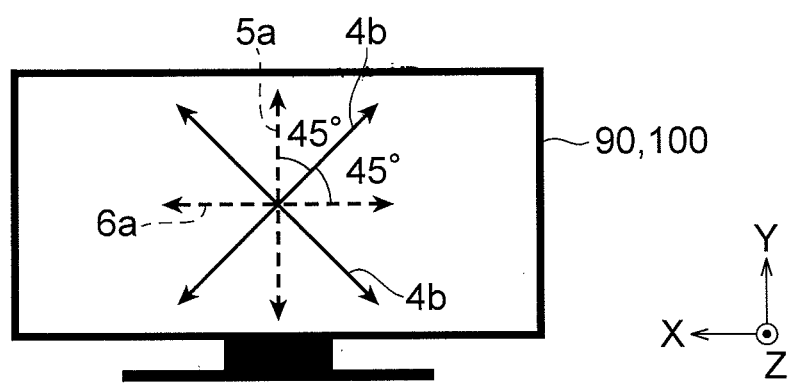
FIG. 13($a$) is a front view of the liquid crystal display device according to the present invention.
Figure 13:
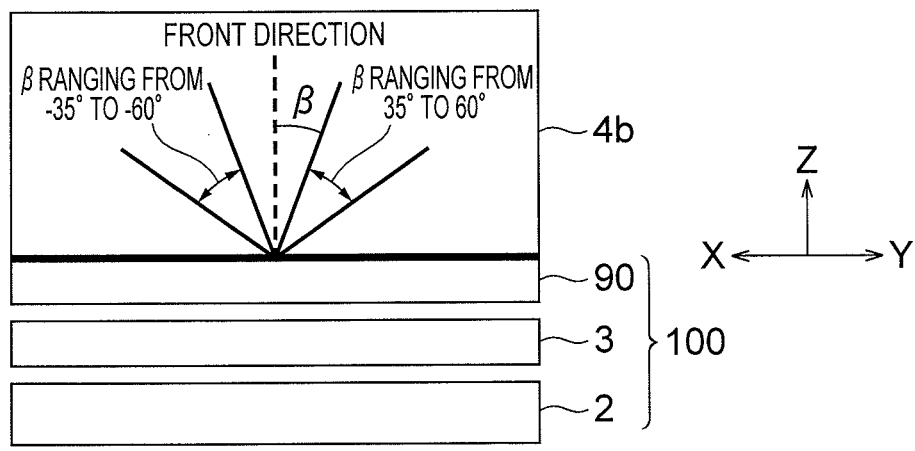

In the liquid crystal display device 100 and the optical path unit 90 having such a configuration, the light emitted from the backlight unit 2 is diffused by the light diffusion plate 3, and then enters the prism film $4a$. In a perpendicular cross section (ZX plane) orthogonal to the transmission axis of the first polarizing plate 5, the light obliquely entering the lower surface of the prism film $4a$ emerges after its path is diverted to the front direction. Subsequently, in a perpendicular cross section (ZY plane) orthogonal to the transmission axis of the second polarizing plate 6 in the prism film $4b$, the light obliquely entering the lower surface of the prism film $4b$ emerges after its path is diverted to the front direction, similar to above. Thus, the light passing through the two prism films $4a$ and $4b$ is collected in the front direction (Z direction) in the both perpendicular cross sections, and the luminance in the front direction is enhanced. As shown in FIGS. 13($a$) and 13($b$), in a planar surface $4b$, which is parallel to directions having an angle of substantially 45° relative to the transmission axis $5a$ of the first polarizing plate 5 and the transmission axis $6a$ of the second polarizing plate 6, and is parallel to the front direction (Z direction), the luminance is decreased in a direction largely inclining relative to the front direction (Z direction), for instance, directions having an angle β defined by the front direction (Z direction) ranging from +35° to +60° and from −35° to −60°. In the provided liquid crystal display device 100, "light leakage of black state" is thus reduced in the directions of substantially 45° from the transmission axes of the polarizing plates. The term "light leakage of black state" herein means a whitening phenomenon in black display.

Referring back to FIG. 1, the light with the directivity in the front direction is converted from circular polarization to linear polarization by the first polarizing plate 5, and enters the liquid crystal cell 1. The light entering the liquid crystal cell 1, whose polarization plane is controlled for every pixel by the orientation of the liquid crystal layer 12 controlled by an electric field, emerges from the liquid crystal cell 1. Then, the light emerging from the liquid crystal cell 1 is converted into an image through the second polarizing plate 6.

As described above, in the liquid crystal display device 100 and the optical path unit 90 of the present invention, the directivity in the front direction of the light entering the liquid crystal cell 1 is higher than that in a conventional device, because of the two prism films 4a and 4b. Thereby, the luminance in the front direction is improved compared with the conventional device. Concurrently, light leakage of black state is reduced in the directions of 45° from the transmission axes of the polarizing plates in the provided liquid crystal display device 100.

Figure 14:
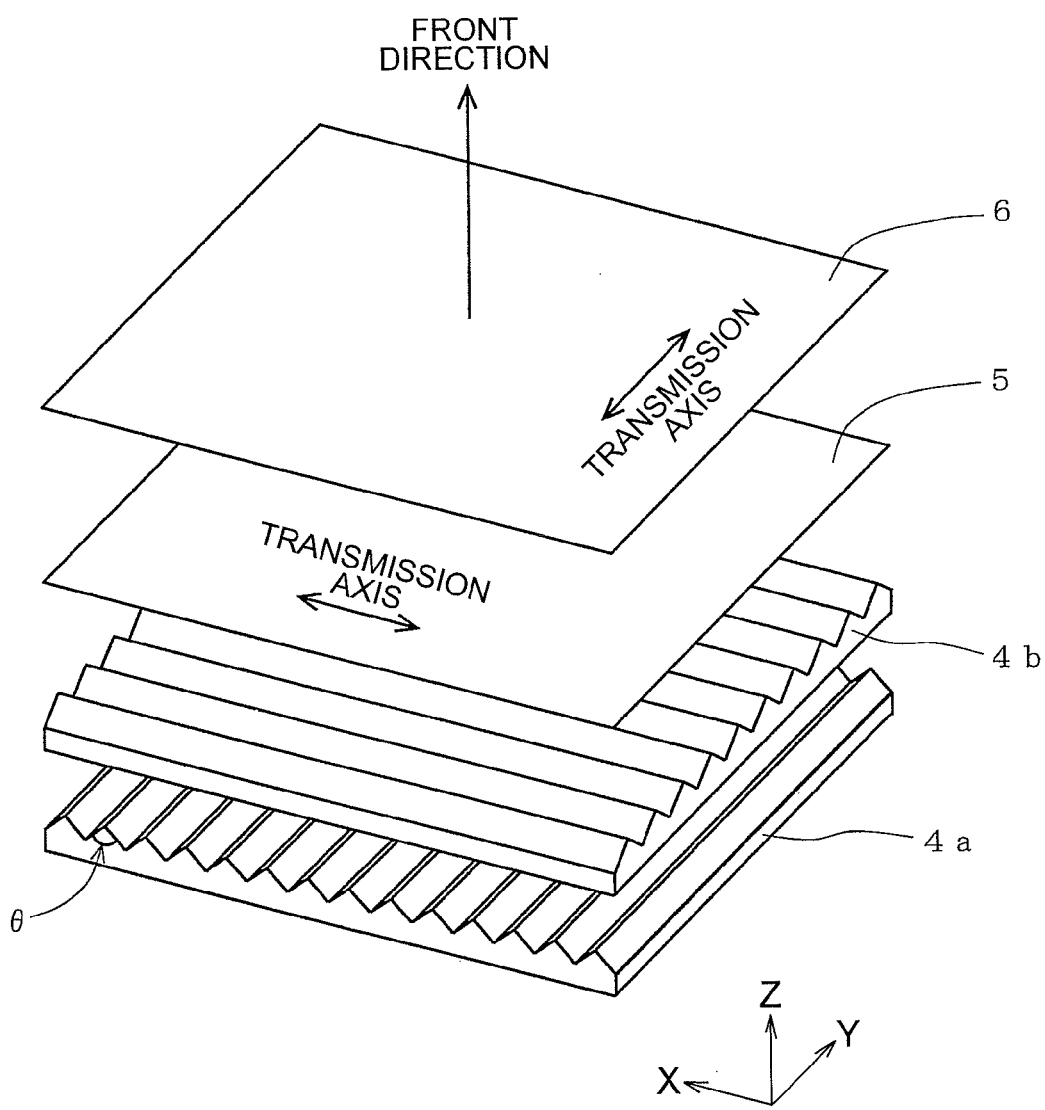
FIG. 14 is a schematic view illustrating an example of a liquid crystal display device according to an alternative embodiment of the present invention.

Subsequently, an embodiment different from the embodiment in FIG. 2 is shown in FIG. 14. In the present embodiment, the transmission axis of a first polarizing plate 5 is the X direction, and the transmission axis of a second polarizing plate 6 is the Y direction; and thus the directions are opposite from those in FIG. 1. Accordingly, a prism film 4a is disposed such that linear ridge lines of linear prisms are provided substantially in parallel with the transmission axis of the second polarizing plate 6. A prism film 4b is disposed such that linear ridge lines of linear prisms are provided substantially in parallel with the transmission axis of the first polarizing plate 5.

The luminance in the front direction is improved in such an embodiment as well. Light leakage of black state is thus reduced at the directions of 45° from the transmission axes of the polarizing plates in the provided liquid crystal display device 100. Furthermore, a tendency is exhibited in which visibility is excellent in the transmission axis of the first polarizing plate 5, and the provided liquid crystal display device 100 is excellent in contrast.

Figure 3:
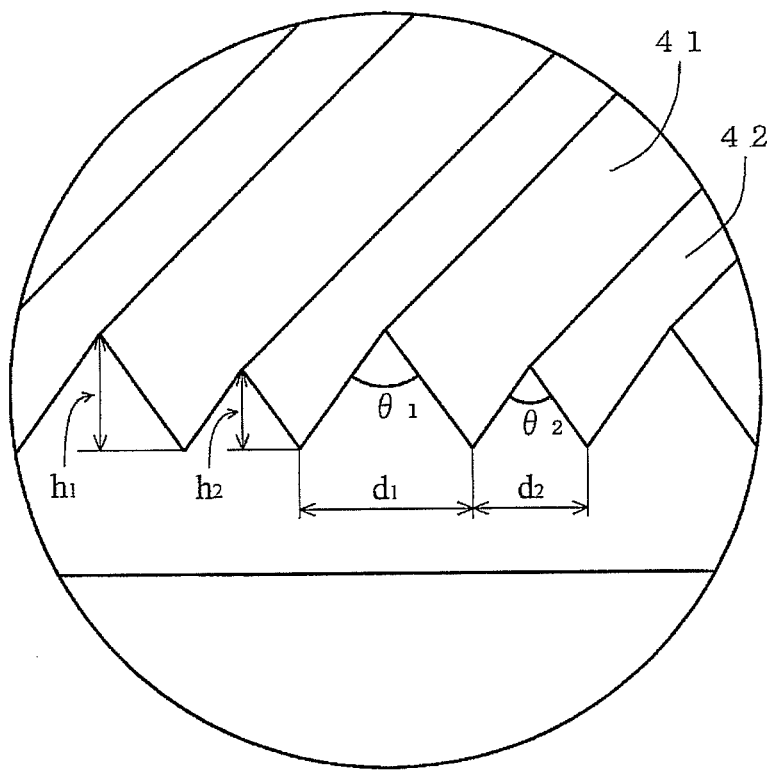
FIG. 3 is a partial perspective view illustrating another example of the prism film used in the present invention.

An alternative embodiment of the prism film that can be used in the present invention is shown in FIG. 3. The prism film in the drawing is similar to one in the previous embodiment in that a plurality of linear prisms having a triangle cross-sectional shape and a linear ridge line viewed from a light exit surface are formed in parallel. The prism film in the drawing, however, is different from one in the previous embodiment in that two types of linear prisms having different heights are alternately formed. That is, the prism film in the drawing consists of alternately provided linear prisms 41 having a height of $h_1$ and linear prisms 42 having a height of $h_2$. The vertex angle $\theta_1$ and the vertex angle $\theta_2$ of the linear prisms 41 and the linear prisms 42, respectively, are equal. The width $d_1$ of the linear prisms 41 and the width $d_2$ of the linear prisms 42 are different. Alternatively, the width $d_1$ of the linear prisms 41 and the width $d_2$ of the linear prisms 42 may be the same, while the vertex angle $\theta_1$ of the linear prisms 41 and the vertex angle $\theta_2$ of the linear prisms 42 may be different. Using the prism film having such configurations can further improve the luminance in the front direction.

The height of the linear prisms formed on the prism film is not limited to two types. It is needless to say that there may be three types or more. Furthermore, an array of linear prisms having different heights is not particularly limited. It is preferred, however, to array the linear prisms having different heights alternately in sequence.

Figure 4:
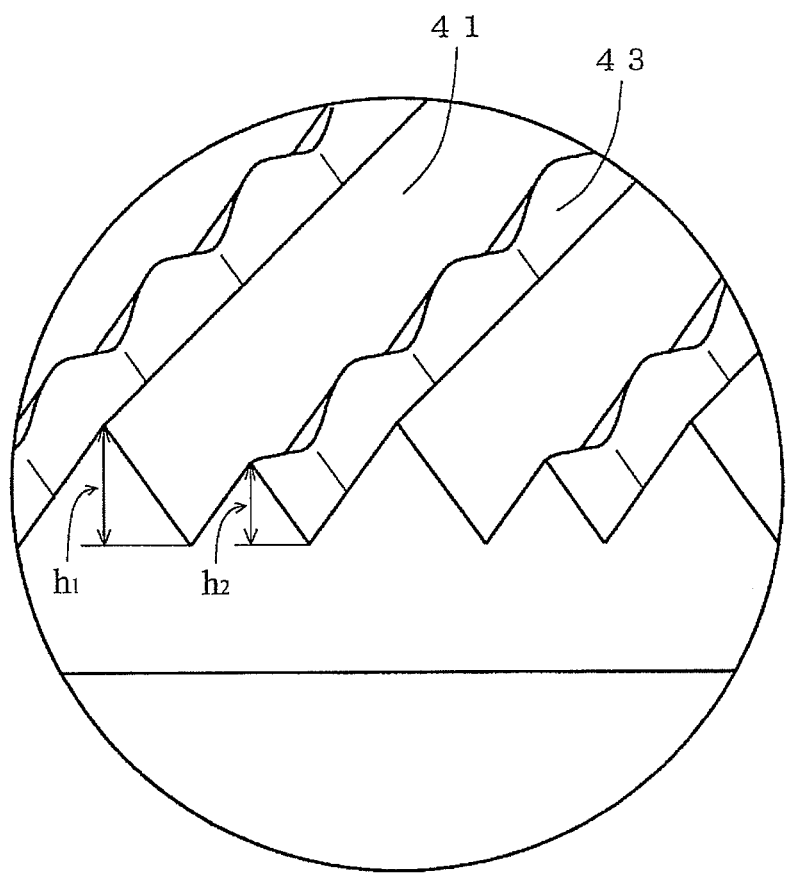
FIG. 4 is a partial perspective view illustrating a further example of the prism film used in the present invention.
Figure 5:
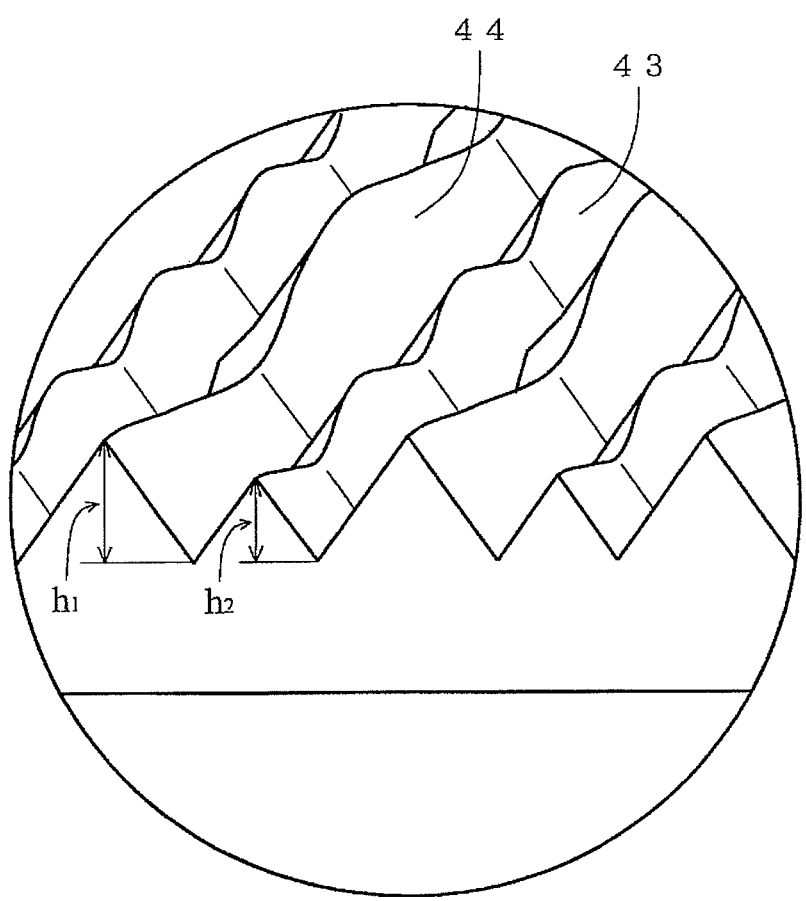
FIG. 5 is a partial perspective view illustrating a still another example of the prism film used in the present invention.

Further alternative embodiments of the prism film are shown in FIGS. 4 and 5. Similar to the embodiment in FIG. 3, the prism film of FIG. 4 consists of alternately provided two types of linear prisms having different heights. The prism film is, however, different from the embodiment in FIG. 3 in that ridge lines of linear prisms 43 having a low height have unevenness in a wavy shape in the height direction. The prism film of FIG. 5 is different from the embodiment in FIG. 3 in that ridge lines of both linear prisms 44 having a high height and linear prisms 43 having a low height have unevenness in a wavy shape in the height direction. As described above, providing the ridge lines of the linear prisms having unevenness in a wavy shape in the height direction can also further improve the luminance in the front direction. The unevenness of the ridge lines is not limited to a wavy shape, but may be a polygonal line shape and the like. The "height of the ridge lines" in the case where the ridge lines have unevenness in the height direction refers to the maximum height.

In the prism films shown in FIGS. 1 and 2 in which the linear prisms having the same height are provided in parallel, the ridge lines of all or a portion of the linear prisms may also be uneven in the height direction.

Figure 6:
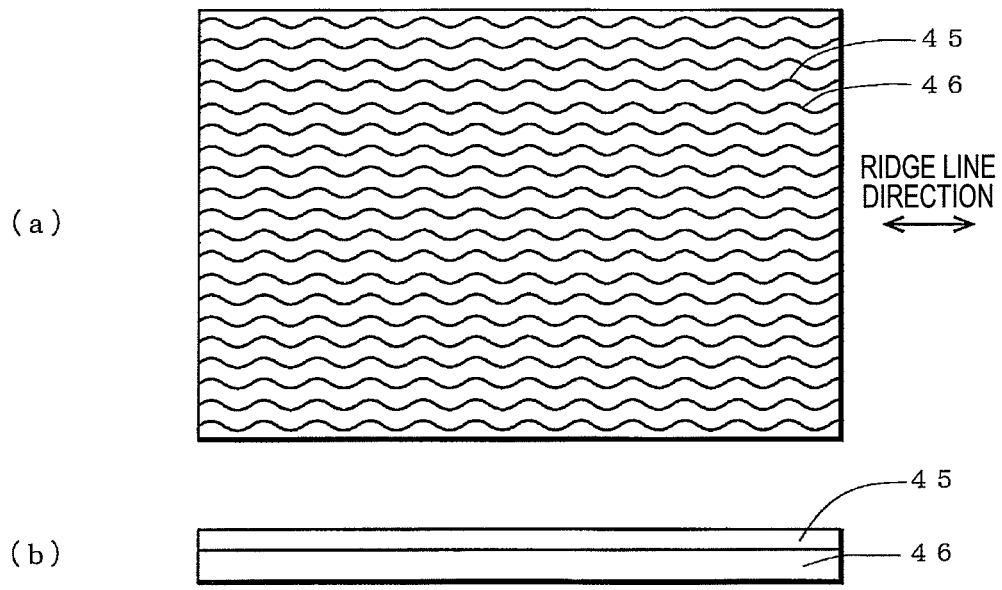
FIG. 6 includes a front view and a side view illustrating a still further example of the prism film used in the present invention.

An alternative embodiment of the prism film is shown in FIG. 6. FIG. 6(a) is a front view of the prism film viewed from a light-exiting surface, and FIG. 6(b) is a side view. As demonstrated in the FIGS. 6(a) and 6(b), the prism film consists of alternately provided two types of linear prisms 45 and 46 having different heights. The ridge lines of the linear prisms 45 and 46 have a wavy shape as being viewed from the light-exiting surface. As being viewed from the side surface, the ridge lines of the linear prisms 45 and 46 have a linear shape, specifically a constant height.

A regression line is obtained by a least-square method from the ridge lines having a wavy shape viewed from the light-exiting surface to be represented by an arrow in the drawing. The direction of the arrow is the direction of the ridge lines of the linear prisms of the drawing.

Figure 7:
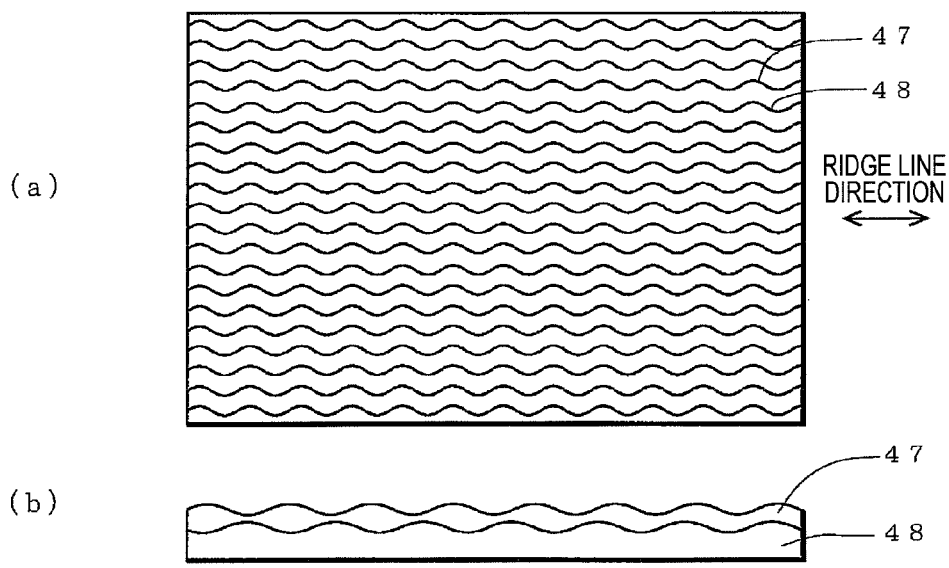
FIG. 7 includes a front view and a side view illustrating another example of the prism film used in the present invention.

A further alternative embodiment of the prism film is shown in FIG. 7. FIG. 7(a) is a front view of the prism film viewed from a light-exiting surface, and FIG. 7(b) is a side view. Similar to the prism film in FIG. 6, the prism film consists of alternately provided two types of linear prisms 47 and 48 having different heights. The ridge lines of the linear prisms 47 and 48 have a wavy shape viewed from the light-exiting surface. Different from the prism film in FIG. 6, the ridge lines of the linear prisms 45 and 46 in the prism film in FIG. 7 have a wavy shape in the height direction viewed from the side surface. The prism film having such a configuration can also further improve the luminance in the front direction.

In the cases of the prism films shown in FIGS. 6 and 7, the ridge lines of the both two types of linear prisms having different heights viewed from the light-exiting surface have a wavy shape. It is needless to say, however, that the ridge lines of one type of the linear prisms viewed from the light-exiting surface may have a wavy shape, whereas the ridge lines of the other type of linear prisms may have a linear shape.

It is preferred that the prism film be flat on the light incident surface. With respect to the flatness of the prism film on the light incident surface, the Ra (mean center-line roughness) measured in accordance with JIS B0601-1994 may be, for example, 0.3 μM or less, preferably 0.1 μm or less, more preferably 0.05 μm or less. Furthermore, the Rz (ten-point mean roughness) measured in accordance with JIS B0601-1994 may be, for example, 1 μm or less, preferably 0.5 μm or less.

The above-described flat surface may be produced in a manner in which a surface of a mold that forms a flat surface is mirror-polished with an abrasive and resin is hot-pressed in the resulting mold.

The prism film being flat on the light incident surface is preferred in view of a tendency of an increase in the luminance in the front direction and, in particular, a reduction in black floating in the directions of 45° from the transmission axes of the polarizing plates in the obtained liquid crystal display device.

Figure 8:
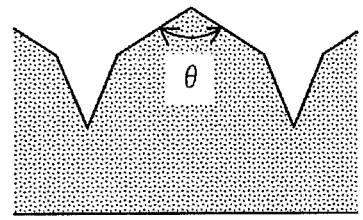
FIG. 8 includes cross-sectional views illustrating examples of a cross-sectional shape of a linear prism formed on the prism film.
Figure 8:
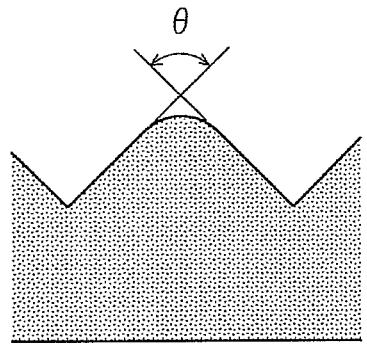

In the embodiments explained above, the vertical cross-sectional shape of all the linear prisms in the perpendicular direction to the ridge line is a triangular shape. The cross-sectional shape of the linear prisms according to the present invention is not limited thereto, but may be a polygonal and tapered shape. As shown in FIG. 8(a), for instance, the shape may be a tapered pentagonal shape. Even with a linear prism having such a polygonal cross-sectional shape, the endmost vertex angle θ is 90° to 110°. As shown in FIG. 8(b), the endmost apex portion of the linear prism may be entirely or partially round in the ridge line.

Each member of the optical path unit and the liquid crystal display device according to the present invention is explained below. First, the liquid crystal cell 1 used in the present invention in FIG. 1 is provided with the pair of transparent substrates 11a and 11b and the liquid crystal layer 12, the transparent substrates 11a and 11b being oppositely disposed at a predetermined distance by a spacer not shown in the drawing, the liquid crystal layer 12 being composed of a liquid crystal encapsulated between the pair of transparent substrates 11a and 11b. Although not shown in the drawing, the pair of transparent substrates 11a and 11b is each provided with a transparent electrode and an oriented film, which are laminated. Applying a voltage based on display data between the transparent electrodes orients the liquid crystal. The display type of the liquid crystal cell 1 herein is TN, but a display type such as IPS and VA may be employed.

The backlight unit 2 is provided with a rectangular parallelepiped case 21 having an opening on an upper surface and a plurality of CCFLs 22 disposed in the case 21 as a linear light source. The case 21 is composed of a resin material or a metal material. In view of reflection of the light emitted from the CCFLs 22 by the internal peripheral surface of the case, it is preferred that at least the internal peripheral surface of the case have a white color or a silver color. In addition to the CCFLs, hot-cathode tubes or linearly disposed LEDs may be used as the light source. In the case where the linear light source is used, there is no particular limit to the number of disposed linear light sources. In view of prevention of luminance unevenness of a luminescent surface, however, it is preferred that the distance between the centers of adjacent linear light sources be within a range of 15 and 150 mm. The backlight unit 2 used in the present invention is not limited to a direct under type shown in FIG. 1. A conventionally known type, such as a side-light type or a planar light source type, may be used, the side-light type having a linear light source or a point light source disposed on a side surface of a light guide plate, the planar light source type having a light source itself having a flat surface shape.

The light diffusion plate 3 is composed of a base material mixed with a dispersed diffusing agent. Examples of the base material to be used polycarbonates; methacrylate resins; methyl methacrylate-styrene copolymer resins; acrylonitrile-styrene copolymer resins; methacrylate-styrene copolymer resins; polystyrenes; polyvinyl chlorides; polyolefins such as polypropylene and polymethylpentene; cyclic polyolefins; polyester resins, such as polyethylene terephthalate, polybutylene terephthalate, and polyethylene naphthalate; polyamide resins; polyarylates; and polyimides. The diffusing agent dispersed into the base material is microparticles composed of a material having a refractive index different from that of the base material. Examples of such a diffusing agent include organic microparticles different from the base material, such as acrylic resins, melamine resins, polyethylenes, polystyrenes, organic silicone resins, and acrylic-styrene copolymers; and inorganic microparticles, such as calcium carbonate, silica, aluminum oxide, barium carbonate, barium sulfate, titanium oxide, and glass. One type from the materials is used, or two or more types from the materials are used as a mixture. Furthermore, organic polymer balloons or glass hollow beads may be used as a diffusing agent. It is preferred that the average particle size of the diffusing agent be within a range of 0.5 μm and 30 μm. The shape of the diffusing agent may not only be spherical, but also be flat, platy, or acicular. The present invention may be embodied without the light diffusion plate 3.

The prism films 4a and 4b each have a flat light incident surface and the plurality of linear prisms having a triangle cross-sectional shape at predetermined intervals on the light-exiting surface. Examples of the material for the prism films 4a and 4b include polycarbonate resins, ABS resins, methacrylate resins, methyl methacrylate-styrene copolymer resins, polystyrene resins, acrylonitrile-styrene copolymer resins, and polyolefin resins, such as polyethylene and polyethylene. A regular molding process of thermoplastic resin may be employed as a method of producing the prism film. For example, production may be performed in hot-press molding using a mold. The thickness of the prism films 4a and 4b is normally 0.1 to 15 mm, preferably 0.5 to 10 mm.

The first polarizing plate 5 and the second polarizing plate 6 generally used in the present invention are each composed of a polarizer having support films bonded on two surfaces thereof. Examples of the polarizer include a polarizer substrate in which an adsorbed dichroic dye or iodine is oriented, the polarizer substrate being composed of a polyvinyl alcohol resin, a polyvinyl acetate resin, an ethylene/vinyl acetate (EVA) resin, an polyamide resin, or a polyester resin; and a polyvinyl alcohol/polyvinylene copolymer containing an oriented molecular chain of a dichroic dehydrated product of polyvinyl alcohol, i.e. polyvinylene, in a molecularly-oriented polyvinyl alcohol film. In particular, a polarizer substrate composed of polyvinyl alcohol resin in which an adsorbed dichroic dye or iodine is oriented is suitably used as the polarizer. There is no particular limit to the thickness of the polarizer. For the purpose of thinning of the polarizer, however, a thickness of 100 μm or less is generally preferable, more preferably a range of 10 and 50 μm, and most preferably a range of 25 and 35 μm.

As the support film that supports and protects the polarizer, a film is preferred which is composed of a polymer having low birefringence and being excellent in transparency, mechanical strength, thermal stability, and waterproof performance. Such a film may be prepared by processing a resin, for example, a cellulose acetate resin, such as TAC (triacetylcellulose); an acrylic resin; a fluorinated resin, such as a tetrafluoroethylene/hexafluoropropylene copolymer; a polycarbonate resin; a polyester resin, such as polyethylene terephthalate; a polyimide resin; a polysulfone resin; a polyether sulfone resin; a polystyrene resin; a polyvinyl alcohol resin; a polyvinyl chloride resin; a polyolefin resin; or a polyamide resin, into a film. Among these materials, a triacetylcellulose film or a norbornene thermoplastic resin film having a surface saponificated with alkaline or any other chemical is preferably used in view of a polarization property and durability. The norbornene thermoplastic resin film is suitably used in particular, since the film serves as an excellent barrier against heat and humidity, thus significantly improving the durability of the polarizing plate 4; and has low moisture absorption, thus significantly enhancing stability in dimensions. Molding and processing into a film shape can be performed by a conventionally known process, such as casting, calendering, or extrusion. There is no limit to the thickness of the support film. In view of thinning of the polarizing plate 4, however, a thickness of 500 μm or less is normally preferable, more preferably a range of 5 and 300 μm, and most preferably a range of 5 and 150 μm.

Figure 9:
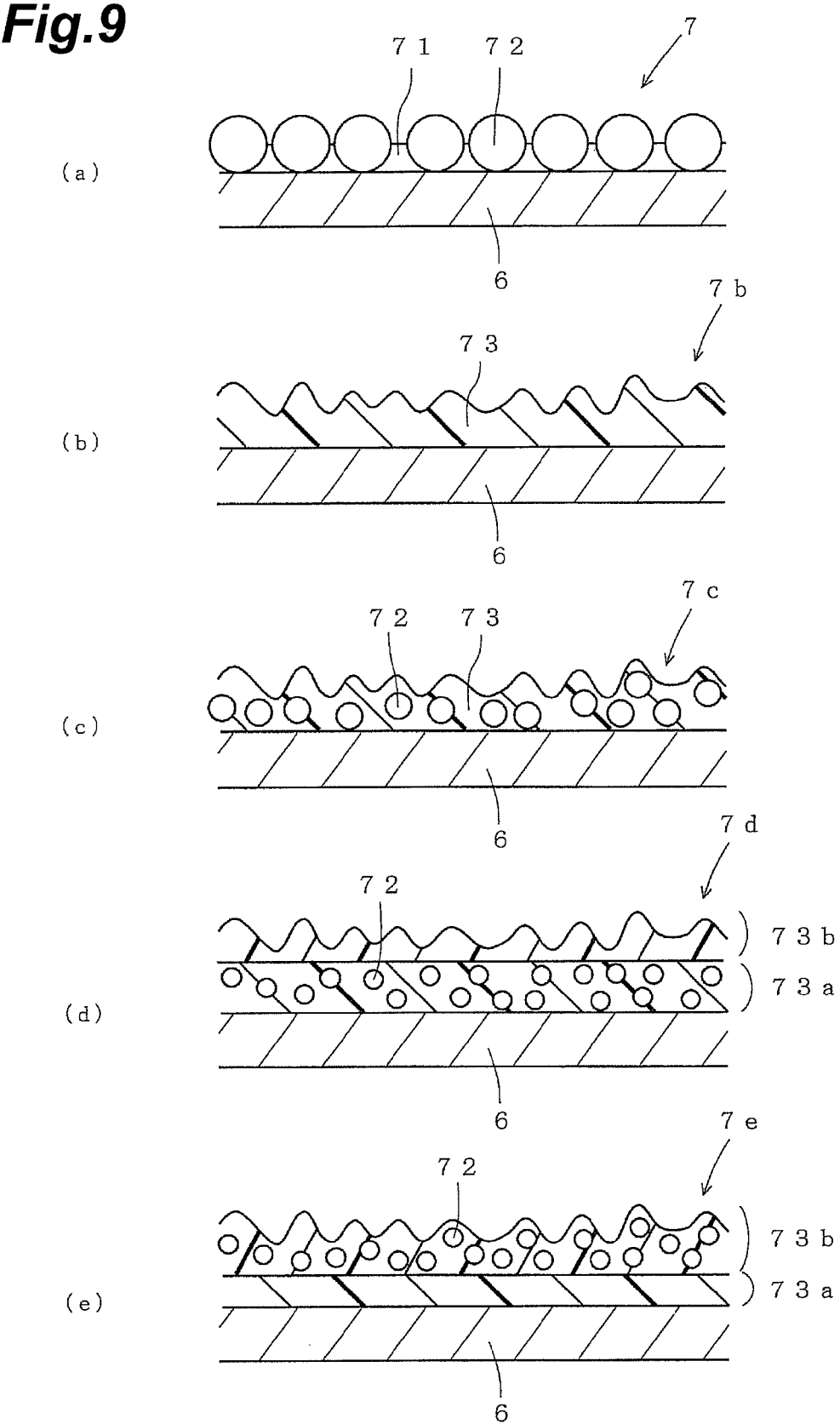
FIG. 9 includes schematic views illustrating examples of the configuration of an anti-glare layer.

FIG. 9 schematically illustrates the anti-glare layer 7. The anti-glare layer 7 in FIG. 9(a) is disposed in the liquid crystal display device of FIG. 1. The anti-glare layer 7 is produced by applying a resin solution 71 in which a micro filler 72 is dispersed onto the second polarizing plate 6; and adjusting the thickness of the applied film such that the filler 72 appears on the surface of the applied film so as to form fine unevenness on the surface of the base material. In this case, isotropic dispersion is preferable for dispersion of the filler 72.

In FIG. 9(b), fine unevenness is formed on a surface of a base material film 73 as an anti-glare layer 7b, without use of a filler. To form fine unevenness on the surface of the base material film 73, a method may be employed in which the surface of the base material film 73 is processed by sandblasting or emboss shaping. Alternatively, a method may be employed in which fine unevenness is formed in the production process of the base material film using a casting mold or an emboss roll having a mold surface provided with reverse unevenness. The anti-glare layer 7b may be bonded with the second polarizing plate 6. It is preferred that bonding of the anti-glare layer 7b and the second polarizing plate 6 be performed in direct contact without a bonding layer therebetween.

Furthermore, the anti-glare layer may have a configuration in which a filler 72 is dispersed and mixed into a base material film 73, and fine unevenness is formed on the surface of the base material film 73, as shown in FIGS. 9(c), 9(d), and 9(d), for instance. An anti-glare layer 7c in FIG. 9(c) is produced by forming fine unevenness by, for example, sandblasting, on the surface of the base material film 73 in which the filler 72 is dispersed and mixed. An anti-glare layer 7d in FIG. 9(d) is produced by bonding a base material film 73b to another base material film 73a, the base material film 73b being provided with fine unevenness on a surface thereof, the base material film 73a containing a dispersed and mixed filler 72. An anti-glare layer 7e in FIG. 9(e) is produced by bonding a base material film 73b to another base material film 73a, the base material film 73b containing a dispersed and mixed filler 72 and being provided with fine unevenness on a surface thereof. Since a polarizer having support films bonded on two surfaces thereof is normally used as the second polarizing plate 6, the support film of the polarizer may be used as the base material film 73a in FIG. 9(e).

Examples of the base material film 73 of the anti-glare layer 7 include a cellulose acetate resin, such as TAC (triacetylcellulose); an acrylic resin; a polycarbonate resin; and a polyester resin, such as polyethylene terephthalate. Examples of the filler 72 may be microparticles having a different refractive index from that of the base material film 73, including organic microparticles, such as acrylic resins, melamine resins, polyethylene, polystyrene, organic silicone resins, and acrylic-styrene copolymers; and inorganic microparticles, such as calcium carbonate, silica, aluminum oxide, barium carbonate, barium sulfate, titanium oxide, and glass. One type from the materials is used, or two or more types from the materials are used as a mixture. Furthermore, organic polymer balloons or glass hollow beads may be used. It is preferred that the average particle size of the filler 72 be within a range of 1 μm and 25 μm. The shape of the filler 72 may be spherical, flat, platy, or acicular. A spherical shape is preferred in particular.

Figure 10:
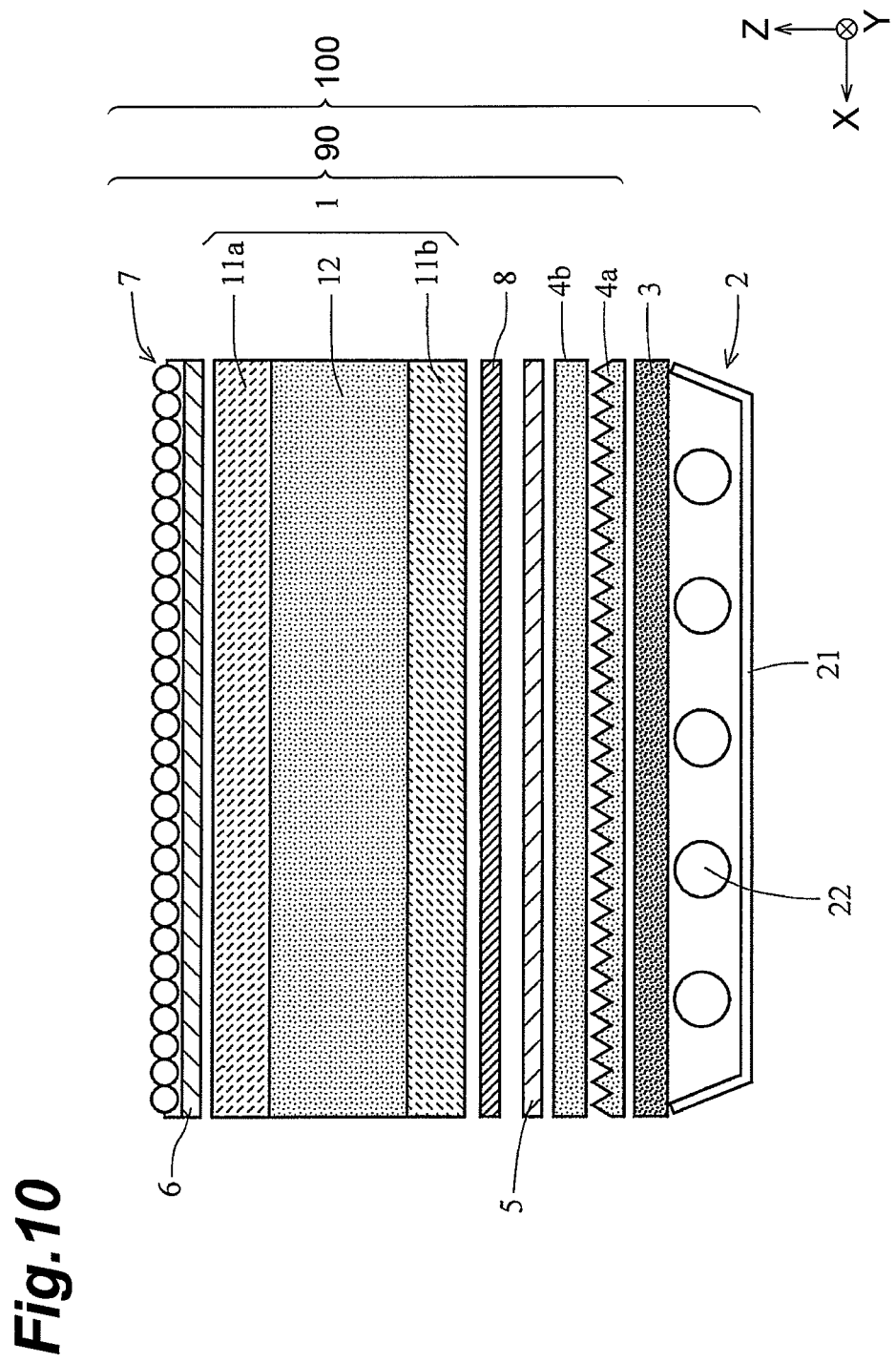
FIG. 10 is a schematic view illustrating an alternative example of the liquid crystal display device according to the present invention.

An alternative embodiment of a liquid crystal display device 100 and an optical path unit 90 according to the present invention is illustrated in FIG. 10. The liquid crystal display device 100 and the optical path unit 90 in FIG. 10 are different from the liquid crystal display device 100 and the optical path unit 90 in FIG. 1 in that a retardation film 8 is disposed between the first polarizing plate 5 and the liquid crystal cell 1. The retardation film 8 substantially has no phase difference in the perpendicular direction to the surface of the liquid crystal cell 1, and has no optical effect from the front, but exhibits a phase difference from an oblique view, thus compensating for the phase difference generated in the liquid crystal cell 1. Thereby, a wider view angle is provided, and more excellent display quality and color reproducibility are achieved. The retardation film 8 may be disposed either or both between the first polarizing plate 5 and the liquid crystal cell 1 or/and between the second polarizing plate 6 and the liquid crystal cell 1.

Examples of the retardation film 8 include a polycarbonate resin or cyclic olefin copolymer resin formed into a film which is then a biaxially-stretched, and a liquid crystal monomer undergoing photopolymerization reaction to fix its molecular arrangement. The retardation film 8, which is used for optical compensation of the liquid crystal arrangement, is composed of a material having a refractive index characteristic opposite to the liquid crystal arrangement. Specifically, for example, a "WV Film" (Fujifilm Corporation) is preferably used for a TN liquid crystal display cell; an "LC Film" (Nippon Oil Corporation) for an STN liquid crystal display cell; a biaxial retardation film for an IPS liquid crystal cell; a retardation film combining an A plate and a C plate, or a biaxial retardation film for a VA liquid crystal cell; and an "OCB WV Film" (Fujifilm Corporation) for a π cell liquid crystal cell.

EXAMPLES (1) Production of Light Diffusion Plate

First, 74.5 parts by mass of styrene-methyl methacrylate copolymer resin (refractive index: 1.57), 25 parts by mass of cross-linked polymethyl methacrylate resin particles (refractive index: 1.49; weight average particle size: 30 μm), 0.5 parts by mass of a benzotriazole ultraviolet absorber ("Sumisorb 200" manufactured by Sumitomo Chemical Co., Ltd.), and 0.2 parts by mass of a hindered phenol antioxidant (thermostabilizer) ("IRGANOX 1010" manufactured by Ciba Specialty Chemicals Corporation) were mixed in a Henschel mixer. Subsequently, the mixture was melt-kneaded in a second extruder, and supplied to a feed block.

Aside from this, 99.5 parts by mass of styrene resin (refractive index: 1.59), 0.07 parts by mass of a benzotriazole ultraviolet absorber ("Sumisorb 200" manufactured by Sumitomo Chemical Co., Ltd.), and 0.13 parts by mass of a light stabilizer ("Tinuvin 770" manufactured by Ciba Specialty Chemicals Corporation) were mixed in a Henschel mixer. Subsequently, the mixture was melt-kneaded together with cross-linked siloxane resin particles ("Trefil DY33-719" manufactured by Dow Corning Toray Co., Ltd.; refractive index: 1.42; weight average particle size: 2 μm) in a first extruder, and then supplied to the feed block. The overall light transmittance Tt of a diffusion plate was controlled by adjusting the amount of cross-linked siloxane resin particles to be added. Thereby, a light diffusion plate having an overall light transmittance Tt of 65% was produced.

Co-extrusion was performed such that the resin supplied to the feed block from the first extruder was shaped into an intermediate layer (base layer) and the resin supplied to the feed block from the second extruder was shaped into surfaces (two surfaces). The light diffusion plate was thus provided as a three-layer laminated plate having a thickness of 2 mm (intermediate layer: 1.90 mm; surface layer: 0.05 mm×2). The overall light transmittance Tt was measured using a haze/transmittance meter (HR-100 manufactured by Murakami Color Research Laboratory Co., Ltd.) in accordance with JIS K 7361.

(2-1) Production of Prism Film (Light Deflecting Means) I

Styrene resin (refractive index: 1.59) was press-molded in a mold having a mirror-polished surface, and thereby a flat plate having a thickness of 1 mm was produced. In the measurement of the resulting flat plate in accordance with JIS B0601-1994, the Ra (mean center-line roughness) was 0.01 μm; and the Rz (ten-point mean roughness) was 0.08 μm. Furthermore, a metal mold was used to press-mold the styrene resin plate again, the metal mold being provided with parallel V-shaped linear grooves having an isosceles triangular cross section of a vertex angle θ and a distance between ridge lines of 50 μm. Thereby, a prism film was produced. Three prism films I were produced herein having vertex angles θ of 90°, 95°, and 110°, respectively. With the three vertex angles θ, the prism films I each had a luminance value in a direction of an output angle of 50° relative to a perpendicular line of a light incident surface, of 20% or less of a luminance value in a direction of an output angle of 0° within the surface orthogonal to the light incident surface and orthogonal to the ridge lines, in assembly in the liquid crystal display apparatus used in the examples hereinafter described.

(2-1) Production of Prism Film (Light Deflecting Means) II

Styrene resin (refractive index: 1.59) was press-molded in a mold having a mirror-polished surface, and thereby a flat plate having a thickness of 1 mm was produced. In the measurement of the resulting flat plate in accordance with JIS B0601-1994, the Ra (mean center-line roughness) was 0.01 μm; and the Rz (ten-point mean roughness) was 0.08 μm. Furthermore, a metal mold was used to press-mold the styrene resin plate again, the metal mold being provided with parallel V-shaped linear grooves having a predetermined isosceles triangular shape. Thereby, a prism film was produced. Three prism films II were produced herein having vertex angles of 90°, 95°, and 110°, respectively. Two types of linear prisms having different heights and widths were alternately arrayed on the prism film having a vertex angle θ of 95°, the linear prisms consisting of the linear prism having a vertex angle θ of 95°, a height of 24.8 μm, and a width of 55 μm, and the linear prism having a vertex angle θ of 95°, a height of 20.4 μm, and a width of 45 μm.

Two types of linear prisms having different heights and widths were alternately arrayed on the prism film II having a vertex angle θ of 90°, the linear prisms consisting of the linear prism having a vertex angle θ of 90°, a height of 27.5 μm, and a width of 55 μm, and the linear prism having a vertex angle θ of 90°, a height of 22.5 μm, and a width of 45 μm.

Two types of linear prisms having different heights and widths were alternately arrayed on the prism film II having a vertex angle of 110°, the linear prisms consisting of the linear prism having a vertex angle θ of 110°, a height of 19.3 μm, and a width of 55 μm, and the linear prism having a vertex angle θ of 110°, a height of 15.8 μm, and a width of 45 μm.

(3) Production of Liquid Crystal Display Device

For the backlight unit of the liquid crystal display device used in the subsequent examples, the above-described light diffusion plate and two prism films were laminated into the arrangement shown in FIG. 1.

Production Example 1 of Anti-Glare Layer (1) Production of Embossing Mold

An iron roll having a diameter of 200 mm (JIS STKM13A) whose surface was copper-ballad-plated was prepared. The copper ballad plating consisted of a copper-plated layer, a thin silver-plated layer, and a surface copper-plated layer. The total thickness of the plated layers was approximately 200 μm. The copper-plated surface was mirror-polished. Then, a blasting device (Fuji Manufacturing Co., Ltd.) was used to blast the polished surface with zirconia beads TZ-B125 (Tosoh Corporation; average particle size: 125 μm) as first microparticles at a blast pressure of 0.05 MPa (gauge pressure, the same hereinafter) and a amount of microparticles used of 16 g/cm² (amount per 1 cm² of the surface area of the roll, the same hereinafter), so as to form unevenness on the surface. A blasting device (Fuji Manufacturing Co., Ltd.) was used to blast the uneven surface with zirconia beads TZ-SX-17 (Tosoh Corporation; average particle size: 20 μm) as second microparticles at a blast pressure of 0.1 MPa and a amount of microparticles used of 4 g/cm², so as to refine the surface unevenness. The resulting copper plated iron roll having unevenness was etched with a copper (II) chloride solution. The etched depth was set to 3 μm. Chrome plating was performed thereafter, and thus a mold was produced. The thickness of chrome plating was set to 4 μm. The chrome-plated surface of the resulting mold had a Vickers hardness of 1,000. The Vickers hardness was measured in accordance with JIS Z 2244 using an Ultrasonic Hardness Tester MIC 10 (Krautkramer, the same Vickers hardness measurement method hereinafter).

(2) Preparation of Anti-Glare Layer Composed of Fine Uneven Layer and Base Material Film Pentaerythritol triacrylate (60 parts by mass) and polyfunctional urethane acrylate (a reaction product of hexamethylene diisocyanate and pentaerythritol triacrylate, 40 parts by mass) were placed into an ethyl acetate solution, and prepared to provide a solid content concentration of 60%. Thereby, an ultraviolet curable resin composition was produced. The refractive index of the cured material produced by removal of ethyl acetate from the composition and ultraviolet curing of it was 1.53.

Subsequently, 40 parts by mass of polystyrene particles "XX-282K" (Sekisui Plastics Co., Ltd.; weight average particle size: 2.0 μm) as a filler and 5 parts by mass of "Lucirin TPO" (BASF; chemical name: 2,4,6-trimethylbenzoyl diphenylphosphine oxide), which was a photopolymerization initiator, were added to 100 parts by mass of a solid content of the ultraviolet curable resin composition. Then, the mixture was diluted with ethyl acetate so as to provide a solid content of 50%. Coating liquid was thus prepared.

The coating liquid was applied on a triacetylcellulose (TAC) film (base material film) having a thickness of 80 μm such that the thickness of the dried coating film was 12.6 μm. The base material film was then dried for 1 minute in a drying machine set to 80° C. The dried base material film was pressed against and tightly attached to the uneven surface of the mold produced in above-described (1) using a rubber roll such that the ultraviolet curable resin composition layer was provided on the mold side. In this state, light from a high pressure mercury lamp having an intensity of 20 mW/cm$^2$ was radiated on the base material film so as to provide an h-ray converted light intensity of 300 mJ/cm$^2$, and thus the ultraviolet curable resin composition layer was cured. Thereby, the anti-glare layer 7e having the configuration shown in FIG. 9(e) was produced, the anti-glare layer 7e being composed of the layer having unevenness on the surface (thickness of 12.6 μm) and the base material film.

(3) Measurement of Light Diffusion Properties of Anti-Glare Layer

Figure 11:
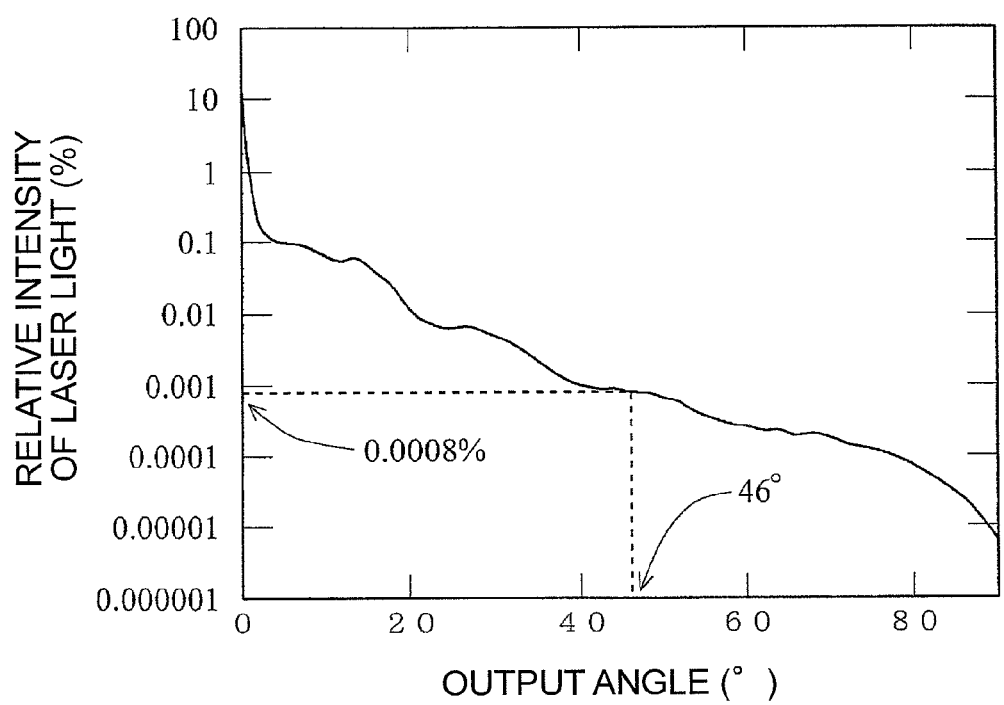
FIG. 11 is an example graph plotting the relative intensity of the laser light emerging from the anti-glare layer versus the output angle.
Figure 12:
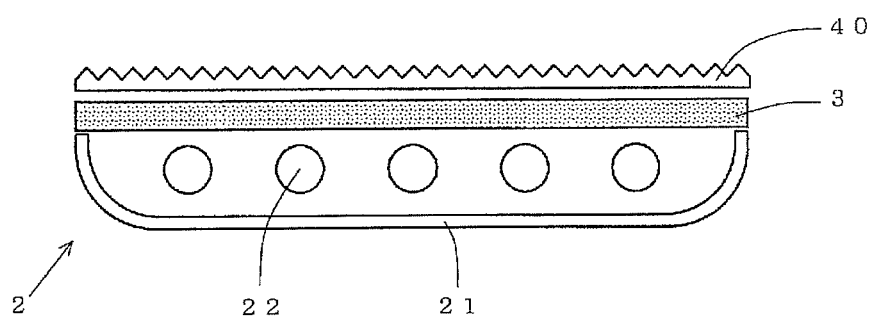
FIG. 12 is a schematic view illustrating an example of a conventional liquid crystal display device.

The base material film 73a of the anti-glare layer produced in (2) and a glass substrate were bonded. Collimated light from a He—Ne laser of 549 nm was radiated on the glass surface from the perpendicular direction of the base material film 73a. The intensity of laser light was measured at a predetermined output angle of 0° to 90° from the perpendicular direction of the lower surface of the layer 73b having unevenness on the surface of the anti-glare film 7e. As a light diffusion property of the anti-glare layer, the output angle from the perpendicular direction producing a rate of the output light intensity to the incident light intensity of 0.0008% was defined as an output angle α. The results were shown in FIG. 11. The output angle α having a relative strength of 0.0008% was 46° according to FIG. 11.

The measurement was performed using a "3292 03 Optical Power Sensor" and a "3292 Optical Power Meter" manufactured by Yokogawa Electric Corporation.

Production Example 2 of Anti-Glare Layer

An anti-glare layer was produced as in Example 1, except that 10 parts by mass of silicone particles "Tospearl 120" (Momentive Performance Materials Inc.; weight average particle size: 2.0 μm) were added to 100 parts by mass of a solid content of the ultraviolet curable resin composition and that the thickness of the layer 73b having unevenness on the surface was 8.4 μm. The light diffusion property of the produced anti-glare layer was measured as described above. The results were shown in Table 1.

Production Example 3 of Anti-Glare Layer

An anti-glare layer was produced as in Example 1, except that 35 parts by mass of silicone particles "Tospearl 145" (Momentive Performance Materials Inc.; weight average particle size: 4.5 μm) were added to 100 parts by mass of a solid content of the ultraviolet curable resin composition, and that the thickness of the layer 73b having unevenness on the surface was 9.9 μm. The light diffusion property of the produced anti-glare layer was measured as described above. The results were shown in Table 1.

TABLE 1

| | Filler | | | | Light |
|---|---|---|---|---|---|
| | Average particle size | Refractive index | Added amount (parts by weight) | Anti-glare layer Thickness (μm) | diffusion property Output angle (°) |
| Production Example 1 | 2.0 μm | 1.59 | 40 | 92.6 | 46 |
| Production Example 2 | 2.0 μm | 1.43 | 10 | 88.4 | 58 |
| Production Example 3 | 4.5 μm | 1.43 | 35 | 89.9 | 42 |

Example 1

Example 1 of Liquid Crystal Display Device

The light diffusion plate produced as above and the prism films I having vertex angles of 90°, 95°, and 110° produced as above were each installed in a backlight unit of a Sharp VA 32" liquid crystal TV LC-32D10-B. As shown in FIG. 2, two prism films in the liquid crystal display device were disposed such that directions of ridge lines of linear prisms thereof were orthogonal. Polarizing plates on two surfaces of the liquid crystal cell of the liquid crystal TV above were peeled off. Iodine-based regular polarizing plates "TRW842AP7" available from Sumitomo Chemical were then bonded to the front and rear surfaces of the liquid crystal cell such that the polarizing plates had a crossed Nicols relationship and the transmission axes of the polarizing plates were in parallel with short sides and long sides, respectively, of the liquid crystal cell. The arrangement of the prism films and the polarizing plates was the same as that in FIG. 2. Finally, the anti-glare layer having an output angle of 46° was bonded to the front surface of the second polarizing plate, the output angle having a relative strength of 0.0008% relative to the perpendicular direction of the lower surface. Thus, the liquid crystal display device as one example of the present invention was produced, and visual evaluated. The results were shown in Table 2.

TABLE 2

| | Vertex angle of linear prism | | |
|---|---|---|---|
| Visual angle | 90° | 95° | 110° |
| 0° (Front) | ○ | ○ | ○ |
| 40° | ○ | ○ | ○ |
| 50° | ○ | ○ | ○ |
| 60° | ▲ | ○ | Δ |

○: Satisfactory visibility
Δ: Gradation collapse bearable for use
▲: Fluctuating luminance bearable for use
X: Changes unbearable for use As demonstrated in Table 2, visibility from the front was satisfactory over all conditions. Neither gradation reversal nor light leakage of black state was observed up to a visual angle of 50° with the prism film having a vertex angle of 90°. However, the luminance somewhat decreased at a visual angle of 60°, though it was bearable for use. Visibility was satisfactory with the prism film having a vertex angle of 95° even if the visual angle was increased. Visibility was satisfactory up to a visual angle of 50° with the prism film having a vertex angle of 110°. Although gradation collapse was somewhat observed at a visual angle of 60°, it was not a defective level. The visual angle herein refers to an angle corresponding to the output angle β on the planar surface 4b in FIG. 13(b).

Furthermore, a light diffusion plate having V-shaped liner grooves arrayed in parallel and two prism films on the light-exiting surface of the light diffusion plate were disposed. The vertex angle was changed to 90°, 95°, and 110°. Visual evaluation was performed under the same conditions as above, and similar results were obtained.

Similar results were obtained with a TN liquid crystal device and an IPS liquid crystal device.

Furthermore, as shown in FIGS. 13(a) and 13(b), the light emitted into the planar surface 4b was measured using Topcon BM-7A, the planar surface 4b being parallel to directions having an angle of substantially 45° relative to the transmission axis 5a of the first polarizing plate 5 and the transmission axis 6a of the second polarizing plate 6, and being parallel to the front direction (Z direction). The light intensity was measured by changing the output angle β every 2° from −74° to +74°, the output angle β being relative to the front direction (Z direction) in the planar surface 4b of FIG. 13(b). The results were shown in FIGS. 15(a), 15(b), and 15(c) in the sequence of vertex angles 0 of 90°, 95°, and 110°, respectively.

Figure 15:
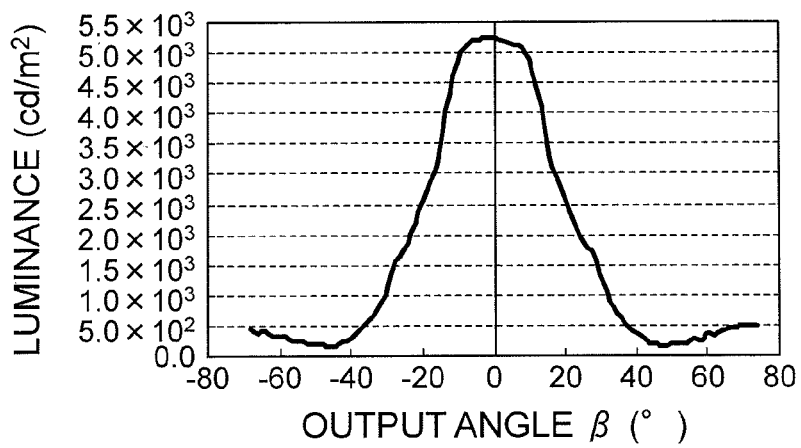
FIGS. 15($a$), 15($b$), and 15($c$) are graphs illustrating the results of observed intensity of light in cases where prism films I having vertex angles of 90°, 95°, and 110° are used in the sequence in the first embodiment and an output angle $\beta$ is changed every 2° from −74° to +74°, the output angle $\beta$ being relative to the front direction (Z direction) in the planar surface $4b$ of FIGS. 13($a$) and 13($b$).
Figure 15:
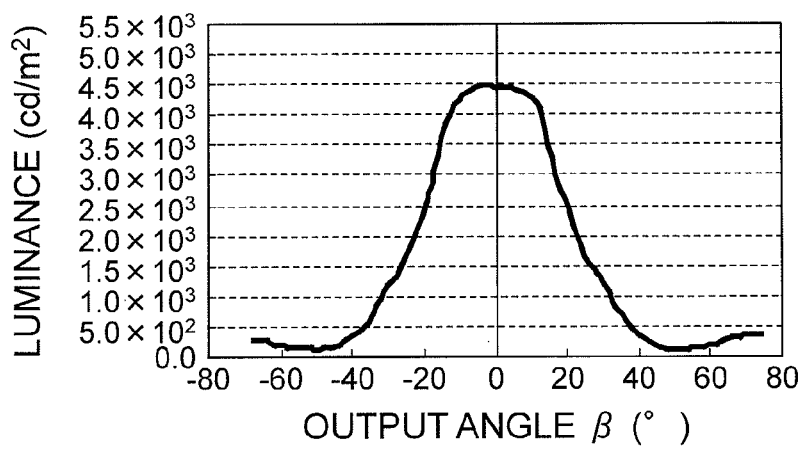
Figure 15:
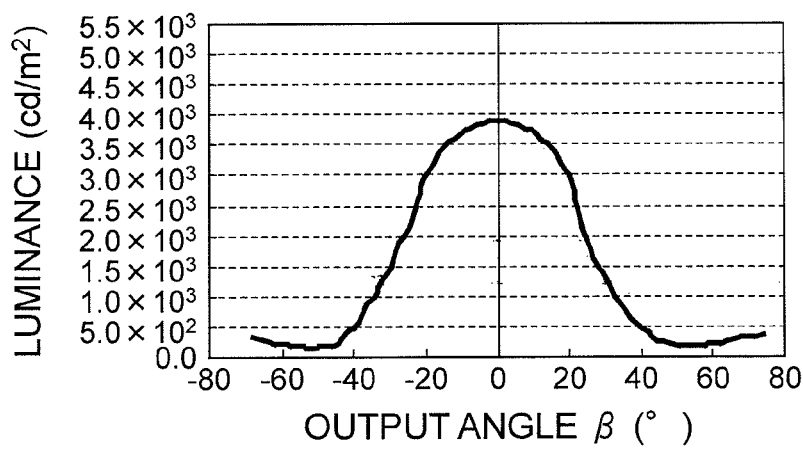

As demonstrated in FIG. 15, the luminance was substantially minimum at an output angle β in ranges from +35° to +60° and from −35° to −60°. It was demonstrated that "light leakage of black state" was reduced in the directions of substantially 45° from the transmission axes of the polarizing plates in the resulting liquid crystal display device.

Example 2

Example 2 of Liquid Crystal Display Device

A liquid crystal display device was produced as in Example 1, except that the prism films II produced as above were used as the prism film 4a in the liquid crystal display device in FIG. 2. Visual evaluation was then performed. Similar results to the case of the liquid crystal display device in Example 1 were obtained as shown in Table 3.

TABLE 3

| | Vertex angle of linear prism | | |
|---|---|---|---|
| Visual angle | 90° | 95° | 110° |
| 0° (Front) | ○ | ○ | ○ |
| 40° | ○ | ○ | ○ |
| 50° | ○ | ○ | ○ |
| 60° | ▲ | ○ | Δ |

○: Satisfactory visibility
Δ: Gradation collapse bearable for use
▲: Fluctuating luminance bearable for use
X: Changes unbearable for use Example 3

Example 3 of Liquid Crystal Display Device

The liquid crystal display device having the configuration of FIG. 14 was used. Specifically, a liquid crystal display device was produced as in Example 1, except that the transmission axes of the polarizing plates 5 and 6 were respectively rotated by 90° toward the Z axis. Visual evaluation was then performed. Similar results to the case of the liquid crystal display device in Example 1 were obtained as shown in Table 4.

TABLE 4

| | Vertex angle of linear prism | | |
|---|---|---|---|
| Visual angle | 90° | 95° | 110° |
| 0° | ○ | ○ | ○ |
| 40° | ○ | ○ | ○ |
| 50° | ○ | ○ | ○ |
| 60° | ▲ | ○ | Δ |

○: Satisfactory visibility
Δ: Gradation collapse bearable for use
▲: Fluctuating luminance bearable for use
X: Changes unbearable for use The liquid crystal display device above was visually evaluated by changing the output angle β similar to FIG. 13(b) in the plane (ZY plane) parallel to the transmission axis of the polarizing plate 5 and parallel to the front direction (Z direction). Visibility was all satisfactory up to ±60°, and neither gradation collapse nor fluctuating luminance was observed.

Similar results were obtained with a TN liquid crystal device and an IPS liquid crystal device.

INDUSTRIAL APPLICABILITY

In the liquid crystal display device according to the present invention, the light emitted from the backlight unit is collected in the front direction, and the luminance in the front direction is enhanced.

REFERENCE SIGNS LIST

| | Reference Signs List |
|---|---|
| 1 | Liquid crystal cell |
| 2 | Backlight unit |
| 3 | Light diffusion plate (light diffusion means) |
| 4a, 4b | Prism film (light deflecting means) |
| 5 | First polarizing plate |
| 6 | Second polarizing plate |
| 7 | Anti-glare layer |
| 8 | Retardation film |
| 0 | Vertex angle |
| 41-48 | Linear prisms |

The invention claimed is:
1. An optical path unit comprising, in sequence from a light incident direction:
   a light deflecting means;
   a first polarizing plate;
   a liquid crystal cell having a liquid crystal layer provided between a pair of substrates; and
   a second polarizing plate, wherein
   the first polarizing plate and the second polarizing plate are disposed such that transmission axes thereof have a crossed Nicols relationship;
   the light deflecting means has two prism films provided on a light incident surface with a plurality of linear prisms having a polygonal and tapered cross section and an endmost vertex angle of 90° to 110° at predetermined intervals;
   the light incident surfaces of the two prism films have a center-line average roughness Ra of 0.3 μm or less and a ten-point average roughness Rz of 1 μm or less; and
   one of the prism films is disposed such that a ridge line direction of the linear prisms is substantially in parallel with the transmission axis of the first polarizing plate, and the other prism film is disposed such that a ridge line direction of the linear prisms is substantially in parallel with the transmission axis of the second polarizing plate.

2. The optical path unit according to claim 1, wherein the ridge lines of the linear prisms has a linear shape or a wavy shape viewed from the light incident surface.

3. The optical path unit according to claim 1, wherein either or both of the two prism films has at least two types of linear prisms having different heights.

4. The optical path unit according to claim 1, wherein at least one of the linear prisms has ridge lines uneven in a height direction.

5. A liquid crystal display device comprising, in sequence:
a backlight unit;
a light deflecting means;
a first polarizing plate;
a liquid crystal cell having a liquid crystal layer provided between a pair of substrates; and
a second polarizing plate, wherein
the first polarizing plate and the second polarizing plate are disposed such that transmission axes thereof have a crossed Nicols relationship;
the light deflecting means has two prism films provided on a light incident surface with a plurality of linear prisms having a polygonal and tapered cross section and an endmost vertex angle of 90° to 110° at predetermined intervals;
the light incident surfaces of the two prism films have a center-line average roughness Ra of 0.3 µm or less and a ten-point average roughness Rz of 1 µm or less; and
one of the prism films is disposed such that a ridge line direction of the linear prisms is substantially in parallel with the transmission axis of the first polarizing plate, and the other prism film is disposed such that a ridge line direction of the linear prisms is substantially in parallel with the transmission axis of the second polarizing plate.

6. The liquid crystal display device according to claim 5, wherein a light diffusion means is disposed between the backlight unit and the light deflecting means.

7. The liquid crystal display device according to claim 5, wherein an anti-glare layer is provided on the light incident surface of the second polarizing plate.

8. The liquid crystal display device according to claim 5, wherein the ridge lines of the linear prisms have a linear shape or a wavy shape viewed from the light incident surface.

9. The liquid crystal display device according to claim 5, wherein either or both of the two prism films has at least two types of linear prisms having different heights.

10. The liquid crystal display device according to claim 5, wherein at least one of the linear prisms has ridge lines uneven in a height direction.

* * * * *